United States Patent
Gaskin et al.

(10) Patent No.: US 6,990,897 B2
(45) Date of Patent: Jan. 31, 2006

(54) PRESS AND DELIVERY SYSTEM FOR A PRESS

(75) Inventors: Ian Gaskin, Kent (GB); Andrew Rodgers, Gloucestershire (GB); John White, Oxfordshire (GB)

(73) Assignee: BAS Components Limited, (GB)

( * ) Notice: Subject to any disclaimer, the term of this patent is extended or adjusted under 35 U.S.C. 154(b) by 0 days.

(21) Appl. No.: 10/168,247

(22) PCT Filed: Dec. 15, 2000

(86) PCT No.: PCT/GB00/04840

§ 371 (c)(1),
(2), (4) Date: Oct. 4, 2002

(87) PCT Pub. No.: WO01/43913

PCT Pub. Date: Jun. 21, 2001

(65) Prior Publication Data

US 2003/0116038 A1 Jun. 26, 2003

(30) Foreign Application Priority Data

Dec. 17, 1999 (GB) .................................. 9929931

(51) Int. Cl.
*B23P 21/00* (2006.01)

(52) U.S. Cl. .................... 100/214; 29/787; 29/795; 29/798; 227/117

(58) Field of Classification Search ............... 100/214; 29/715, 716, 813, 816, 817, 428, 795, 798, 29/787; 227/112, 144, 148

See application file for complete search history.

(56) References Cited

U.S. PATENT DOCUMENTS

| | | | |
|---|---|---|---|
| 3,018,257 A | 1/1962 | Spencer .................. 260/2.5 |
| 3,466,730 A | 9/1969 | McHenry et al. | |
| 3,938,239 A | 2/1976 | Lauth ..................... 29/512 |
| 4,348,796 A * | 9/1982 | Smallegan ............. 29/432 |
| 4,455,044 A | 6/1984 | Musits et al. .......... 294/113 |
| 4,463,889 A | 8/1984 | Sartran | |
| 4,519,534 A | 5/1985 | White | |
| 4,765,057 A | 8/1988 | Muller | |
| 4,765,175 A | 8/1988 | Denham et al. ........ 72/391 |
| 5,123,825 A | 6/1992 | Ernst ................... 425/126.1 |
| 5,172,467 A | 12/1992 | Muller ................... 29/716 |
| 5,566,446 A * | 10/1996 | Luckhardt et al. ..... 29/798 |
| 6,018,863 A * | 2/2000 | Altrock ................. 29/716 |

FOREIGN PATENT DOCUMENTS

| | | |
|---|---|---|
| EP | 0943393 | 9/1999 |
| FR | 2796581 | 1/2001 |
| GB | 1474766 | 5/1977 |
| WO | 99/34953 | 7/1999 |

* cited by examiner

*Primary Examiner*—Derris H. Banks
*Assistant Examiner*—Shelley Self
(74) *Attorney, Agent, or Firm*—Ostrolenk, Faber, Gerb & Soffen, LLP

(57) ABSTRACT

An installation head adapted to receive a fastener for securing the fastener to a sheet metal member on actuation of the head by a press. The head includes a main block having a bore, a cylindrical press member disposed within and supported by the bore, the press member having an arrangement for receiving and holding the fastener, wherein the cylindrical press member is rotatable in the bore between a first position, in which the fastener is received by the arrangement for receiving and holding the fastener and held in position relative to the press member, and a second position for actuation of the press.

11 Claims, 3 Drawing Sheets

PRESS AND DELIVERY SYSTEM FOR A PRESS

FIELD OF THE INVENTION

This invention relates to a delivery system device for feeding parts, particularly fasteners such as nuts and studs to progression or transfer presses, and to a press or installation head for pressing the fastener into another component such as a sheet metal member.

BACKGROUND

When mounting a flanged nut or a flanged head stud, such as that sold by the applicants under the trade mark FLANGEFORM and generally described in GB-A-1 474 766, to a formed sheet metal part it is desirable to fix the stud at the same time as performing other pressing operations.

A known problem in the handling of studs in such presses is to ensure correct placement and orientation of the stud throughout its path from a supply container (in which the studs are simply randomly oriented) to its final position fixed to the desired component, e.g. a metal sheet, in the desired position by the press. Studs have a tendency to adopt the wrong position, and if this happens, serious consequences can arise, ranging from an increase in the number of studs inadequately fixed to jamming of the press with consequential loss of production time or even damage to press tools or other components of the press.

By providing better stud positioning and control throughout the path from the supply container to fixture by the press, the incidence of inadequate fixing or other failures can be substantially reduced.

SUMMARY OF THE INVENTION

A first aspect of the present invention provides a press adapted to receive a fastener for securing the fastener to a sheet metal member on actuation of the press, the press comprising a press member which has means for receiving and holding the fastener, wherein the press member is movable between a first position for receiving the fastener and a second position for actuation of the press.

It will be appreciated that the press member may be incorporated in a part of the press head which is moved during the pressing operation.

In a particularly preferred form, the press member receiving and holding means is adapted to receive and hold a shank of a stud.

A second aspect of the invention provides a stud loading mechanism comprising a breech; a plurality of members at an exit end of the breech and biased towards each other, the members forming a tapered outlet at the exit end of the breech; and reciprocating means in the breech adapted to effect a forward stroke to push a stud shank first along the breech towards the tapered outlet and then to push it further until the head of the stud has passed through the tapered outlet while forcing the members apart, and then to execute a retraction stroke.

The tapered aperture may be formed by elongate pivoted members, and serves to align the stud and help control the ejection of the stud from the breech.

Preferably the loading mechanism is used in combination with the press.

Other preferred features of the invention will be apparent from the following description and the accompanying claims.

The invention will now be described by way of example with reference to the accompanying drawings in which:

DETAILED DESCRIPTION

Figure 1:
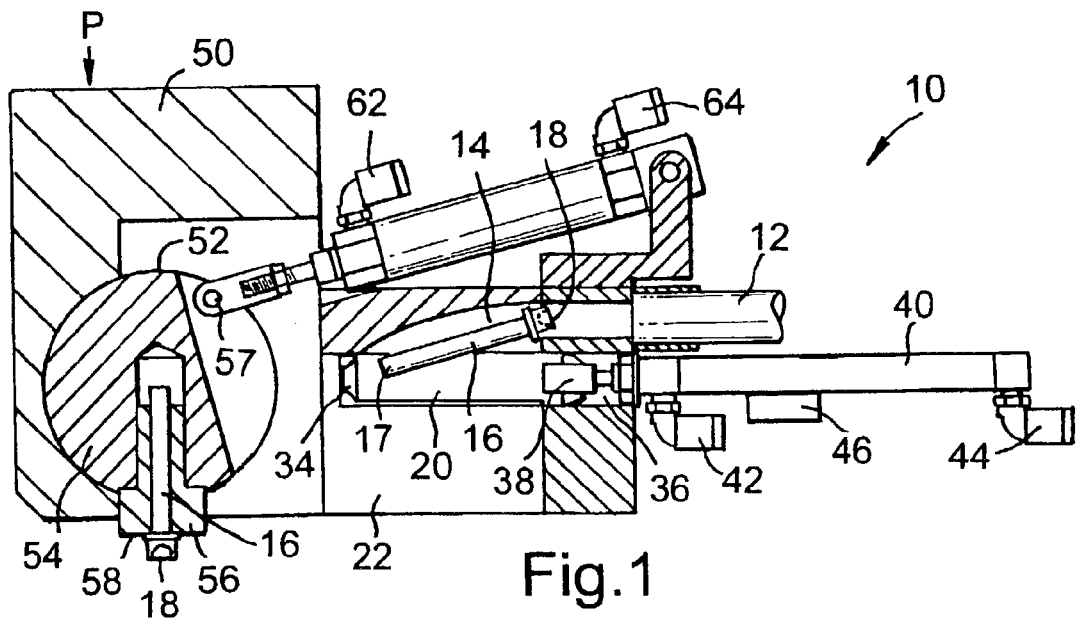
FIGS. 1 and 2 illustrate part of a delivery system according to the invention in part vertical section with a press head and a stud each in two different positions.
Figure 2:
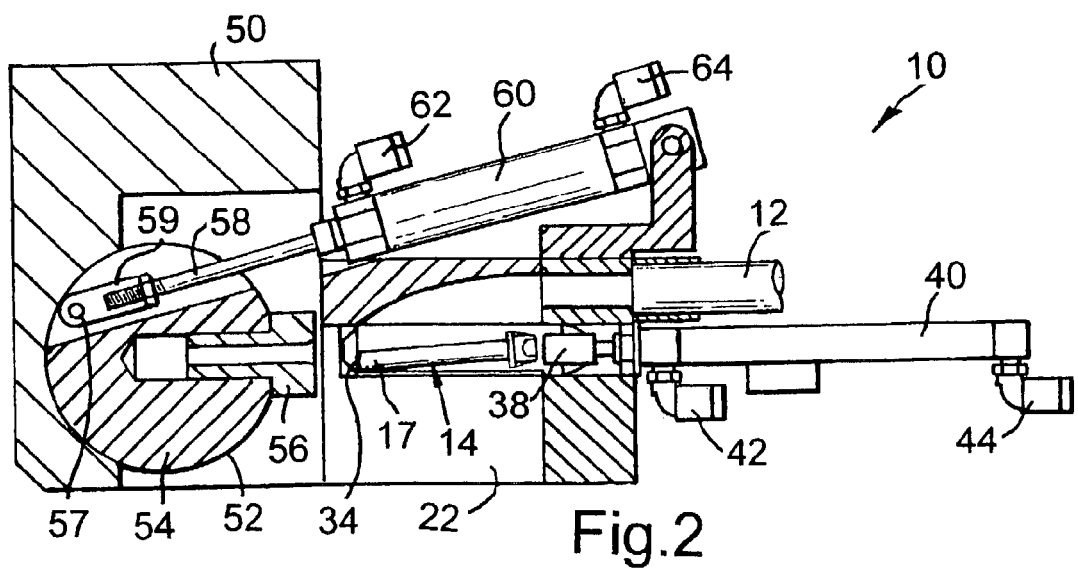

FIGS. 1 and 2 show parts of a press head for a press and comprising a main block 50, vertically reciprocable by means not shown, and incorporating a delivery device indicated generally as 10. The delivery device 10 is connected to one end of a delivery tube 12 along which studs 14, having a shank 16 and a head 18, are fed shank-first. They are fed into the upper end of tube 12 (not shown) by a conventional vibratory bowl feed means (not shown). Below the outlet of delivery tube 12 is a breech 20 set in a tool body 22 into which the studs 14 fall.

Figure 3:
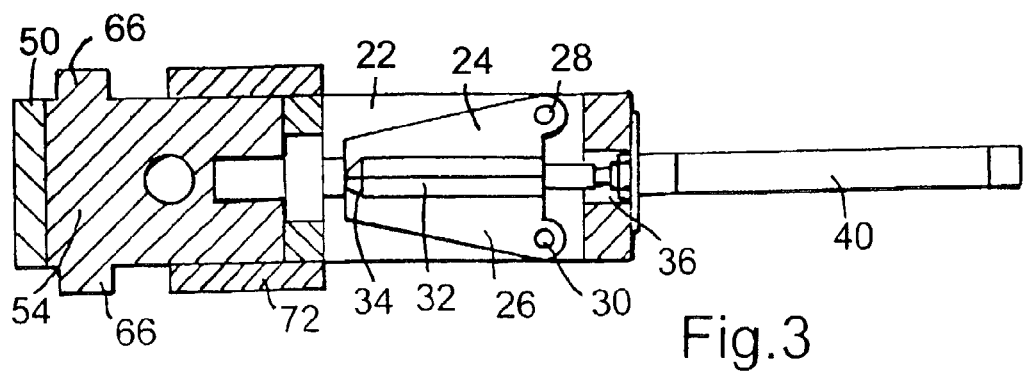
FIGS. 3 and 4 illustrate a part of the system shown in FIGS. 1 and 2 in part horizontal section showing a pair of pivoted members of the stud feed mechanism in two different positions.
Figure 7:
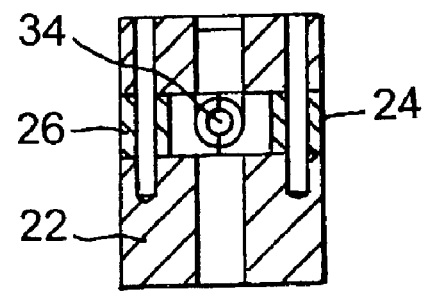

FIG. 3 shows that the breech 20 from above, and shows, in particular, a pair of pivoted members 24,26 pivoted at their ends adjacent the feed tube 12 by vertical axis pivots 28,30, and biased towards each other by means not shown. The pivoted members 24,26 are shaped so that they curved upwards from their contiguous edges to form a half barrel in which a stud can lie (as shown in FIG. 7).

The ends of the pivoted members 24,26 remote from the pivots 28,30 are shaped to form a conical aperture 34. At the other end of the breech 20 adjacent the feed tube 12 there is an aperture 36 on the breech centre line; a thrust member 38 is located inside the breech 20 and is reciprocable within the breech by a double-acting piston cylinder 40. The piston is pneumatically operable, as indicated by the pressure/exhaust ports 42, 44, connected to a pressure source not shown, and reciprocation of the piston is controllable by a microswitch 46.

FIG. 1 shows a stud 14 just before it falls into the breech 20. FIG. 2 shows the stud after falling; it lies with its head adjacent the thrust member 38 and its central axis sloping downwards because the tip 17 of the stud shank 16 lies on the floor of the half barrel.

As the piston 40 operates to move the thrust member 38 along the breech 20, the stud 14 is pushed so that its tip 17 rides up the tapering aperture 34 until the stud central axis is horizontal, and the stud shank 16 is then pressed through the exit aperture 35.

Figure 4:
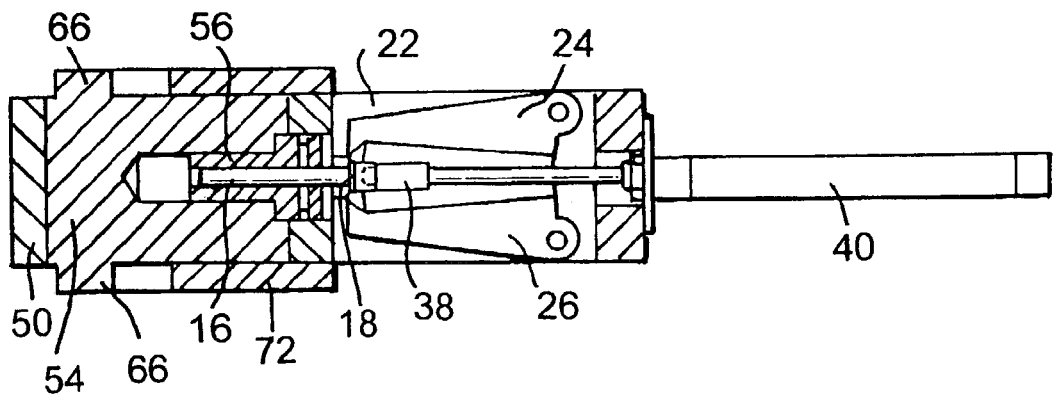
Figure 5:
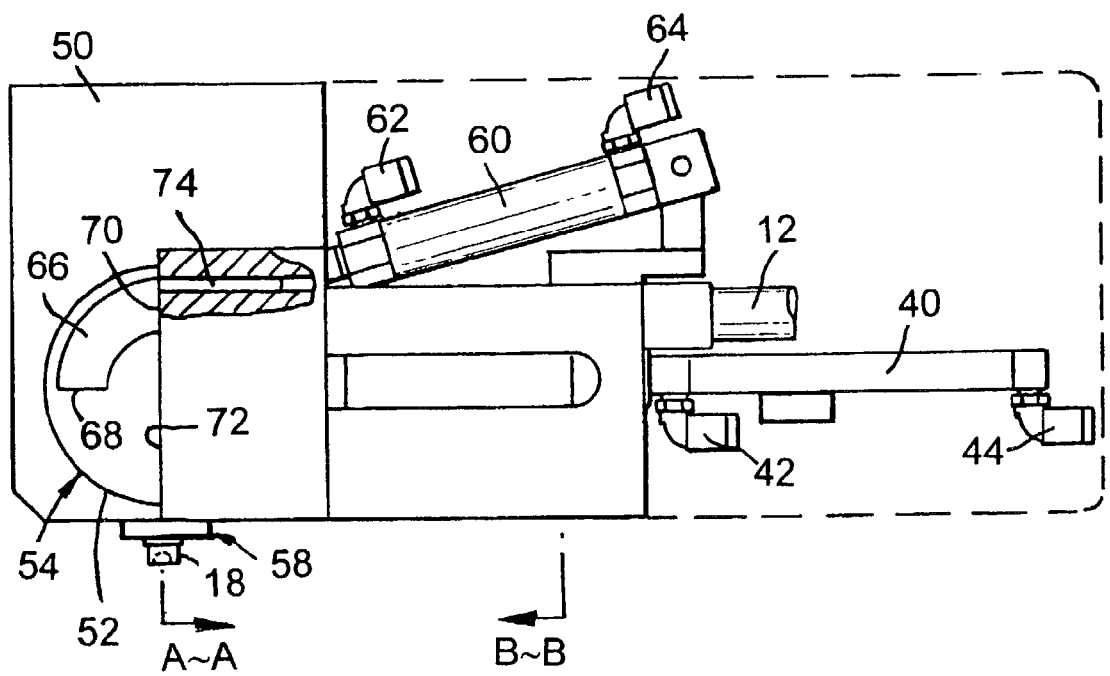
FIG. 5 is a side view of the system of FIG. 1.

So far the pivoted members 24,26 have not moved. As the thrust member 38 moves the stud 14 further along the breech, so that the head 18 of the stud reaches the tapered aperture 34, the pivoted members 24,26 pivot to provide a wider aperture to allow the head to pass. This can be seen in FIG. 4. After the stud head has left the breech 20, the pivoted members are returned to their position shown in FIG. 3 by the spring means (not shown). The piston cylinder 40 retracts the thrust member 38 until it is clear of the end of the delivery tube 12, and another stud is delivered into the breech 20 i.e. as shown in FIG. 1.

Referring now to the left had sides of FIGS. 1 to 5 of the drawings, these show a press head 50 into which the studs are inserted for subsequent placement and fixing during a press operation. To the left of breech exit aperture 35 there is a main block 50 having substantial walls and central circular aperture 52. Within the aperture 52 is a short cylinder 54 (cylindrical press member), rotatable about a horizontal axis at right angles to the axis of piston/cylinder 40 and set within the main block 50. A segmental slot in cylinder 54 allows connection of the cylinder via a connector 59 and pivot 57 to one end of a piston 58 forming part of a pneumatic piston cylinder device 60 having pressure/exhaust ports 64, 64.

Within the cylinder 54 is an arrangement for receiving and holding a fastener. In the illustrated embodiment, the arrangement for receiving and holding includes a radial bore into which is fixed a bush 56 having a central bore forming an entry chamber into which the shank of the stud can pass, as can be seen in FIG. 1. The head 18 of the stud protrudes from the central bore and lies against shoulders 58 of the bush 56.

The cylinder 54 is rotatable in aperture 52, by advancing or retracting piston 58 through 90° between a position in which the bore of bush 56 is horizontal, opening sideways of the press (FIG. 1, defined by abutment between part of cylinder 54 and part of block 50), and one in which it is vertical, opening in the pressing direction (FIG. 1, defined by the abutment of bush 56 against the lower part of block 50). When horizontal, FIG. 2, the bore of the plug 56 is aligned with the axis of tapering apertures 34,35 at the end of the breech 20, so a stud 14 can be pushed through the aperture 34 and into the bore 56. Once this has occurred, the piston 58 may be retracted to rotate the cylinder 54 to a position in which the bore of the bush 56 is vertical, and the head 18 of the stud protrudes below the bush 56, as shown in FIG. 1. With the cylinder 54 in this position, the entire assembly shown in FIGS. 1 to 5 is moved downwards (arrow P) to move stud 14 down to press the head 18 partly through an aperture in a sheet of metal for a forming operation. A die on the underside of the sheet, enables the head of stud 14 to be attached to the metal sheet by known techniques, such as that described in U.S. Pat. Nos. 3,938,239 and 3,018,257. During this process, the stud head 18 is deformed into the die below the sheet under pressure applied by the shoulders 58 of the bush 56.

Figure 6:
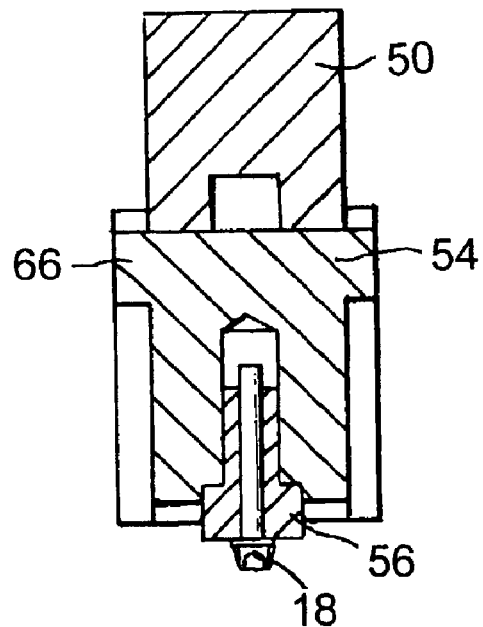
FIGS. 6 and 7 are partial sections along the section lines A—A and B—B in FIG. 5.

The cylinder 54 is supported across substantially it's full width in the aperture 52 in the block 50 as the cylinder 54 is rotated and during the pressing operation, as can be seen from FIG. 6.

As noted above, the cylinder 54 must be reciprocated between the two positions exactly 90° apart and this precision would be difficult to achieve by merely relying on the end positions of the piston within pneumatic cylinder 60. Accurate positioning can be achieved by means shown in FIG. 5. The cylinder 54 has at each end an area milled away to leave an arcuate portion 66 standing proud. The radially extending ends 68, 70 of the arcuate portion 66 visible in FIG. 5 contact a wall 72 protruding from the main block 50 which acts as a stop to limit the movement of precisely 90°. Adjacent the part of the wall 72 which acts as a stop for the end 70, there is a proximity sensor 74 for sensing when the arcuate portion 66 is firmly in contact with the wall 72. If there is no such contact, then the cylinder 54 is not in a position where the bush 56 and stud 14 are accurately vertical, and lowering the assembly to fix the stud 14 in the sheet can be inhibited.

Figure 8:
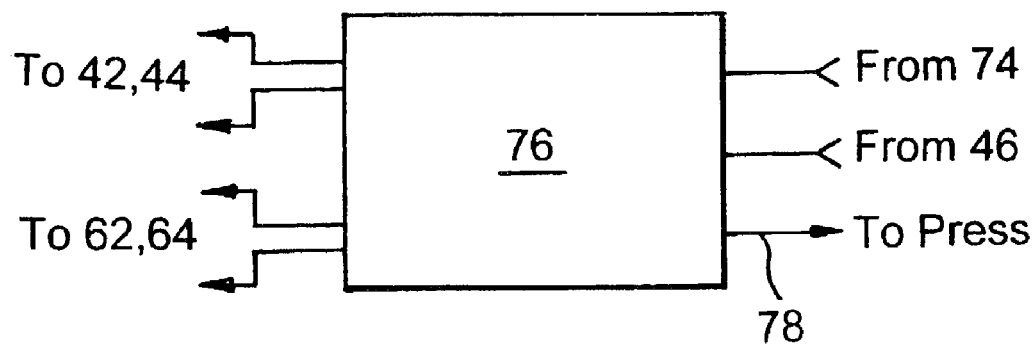
FIG. 8 shows schematically a control arrangement for the system.

FIG. 8 indicates that operation of the stud delivery system and a cold forming press (not shown) can be controlled by a PC 76 which supplies control signals to appropriate electrically controlled valves connected in the pneumatic lines leading to pressure/exhaust ports 42,44 of the cylinder 40 and pressure/exhaust port 62,64 of the cylinder 70, at appropriate times in the operating cycle. The PC 76 has input lines for receiving signals from the proximity sensor 74 and microswitch 46, and an output line 78 to supply an inhibit signal to the main control of the mechanism for operating the press if the rotary cylinder 54 is not in the correct position for the stud to be inserted and fixed efficiently and safely into the sheet.

In operation, starting from the position shown in FIG. 2, the pneumatic cylinder 40 is operated to push the stud 14 shank first into the bush 56 until the stud head 18 clears the members 24,26 and abuts the shoulder 58. The stud shank 18 is gripped in the bush 56, e.g. by a ball and spring mechanism. Piston 60 is then actuated to rotate member 54 to align the stud 14 vertically, as in FIG. 1. The press head 50 is then actuated to affix the stud to a metal sheet which is being worked on. While the press head is operating, a new stud is delivered with the breech 20.

It will be appreciated that the apparatus can be operated with different stud lengths, if the breech 20 and the bore of bush 56 are designed to receive the maximum desired stud length. For different size studs, the bush 56 and pivot members 24,26 can be changed.

What is claimed is:

1. An installation head adapted to receive a fastener for securing the fastener to a sheet metal member on actuation of the head by a press, the head comprising a main block having a bore, a cylindrical press member disposed within and supported by the bore, the press member having an arrangement for receiving and holding the fastener, wherein the cylindrical press member is rotatable about an axis thereof in the bore between a first position, in which the fastener is received by the arrangement for receiving and holding the fastener and held in the first position relative to the press member, and a second position for actuation of the press, the rotation axis of the cylindrical press member being parallel to a longitudinal axis of the bore.

2. A head as claimed in claim 1, in which in the first position the arrangement for receiving and holding the fastener faces sideways of the direction of operation of the press, and in the second position the arrangement for receiving and holding the fastener faces in the direction of pressing.

3. A head as claimed in claim 1, wherein stops are provided to limit the movement of the press member at the first and second positions.

4. A head as claimed in claim 1 including a detection arrangement for detecting the position of the press member.

5. A head as claimed in claim 1, wherein the main block is moved on actuation of the press.

6. A head as claimed in claim 1, wherein the arrangement for receiving and holding the fastener comprises an entry chamber for receiving and holding a shank of a stud.

7. A combination comprising: an installation head as claimed in claim 1; and a stud loading mechanism for loading a stud into the head, the stud loading mechanism comprising a breech; a plurality of members at an exit end of the breech and biased towards each other the members forming a tapered outlet at the exit end of the breech; and a reciprocating arrangement in the breech adapted to effect a forward stroke to push a stud shank first along the breech towards the tapered outlet and then to push it further until the head of the stud has passed through the tapered outlet while forcing the members apart, and then to execute a retraction stroke, the stud being received in the press member.

8. The combination as claimed in claim 7, wherein the breech is defined at least in part by a plurality of elongated members which are pivotally mounted at one end distal of the breech exit and biased towards each other, the other ends of the elongate members defining the members forming the tapered outlet.

9. The combination as claimed in claim 8, wherein the pivoted members define an open channel for receiving a stud, and the pivoted members define a generally circular cross-section, outlet aperture at the exit end of the channel, to align the stud shank as the stud is pushed along the channel.

10. The combination as claimed in claim 9, wherein two of the pivoted members are provided.

11. The combination as claimed in claim 7, wherein a delivery tube is provided for delivery a stud into the breech from above one end thereof.

* * * * *